Oct. 4, 1966   R. E. KLEMICK ETAL   3,276,787
BRAKING SYSTEM FOR HYDRAULIC LIFT TRUCK
Filed April 29, 1964   4 Sheets-Sheet 1

INVENTORS
RICHARD E. KLEMICK
JOHN E. BUDRO
BY
ATT'Y

INVENTORS
RICHARD E. KLEMICK
JOHN E. BUDRO
BY
ATT'Y.

Oct. 4, 1966   R. E. KLEMICK ETAL   3,276,787
BRAKING SYSTEM FOR HYDRAULIC LIFT TRUCK
Filed April 29, 1964   4 Sheets-Sheet 3

INVENTORS
RICHARD E. KLEMICK
JOHN E. BUDRO
BY
*Louis Necho*
ATT'Y.

Oct. 4, 1966  R. E. KLEMICK ETAL  3,276,787
BRAKING SYSTEM FOR HYDRAULIC LIFT TRUCK

Filed April 29, 1964  4 Sheets-Sheet 4

INVENTORS
RICHARD E. KLEMICK
JOHN E. BUDRO
BY
ATT'Y.

3,276,787
BRAKING SYSTEM FOR HYDRAULIC LIFT TRUCK

Richard E. Klemick, R.D. 1, Orwigsburg, Pa., and John E. Budro, Mahanoy City, Pa.
Filed Apr. 29, 1964, Ser. No. 363,364
1 Claim. (Cl. 280—43.12)

This invention relates to a hydraulic brake system to be used in conjunction with a hydraulically powered lift truck.

More specifically, this invention relates to a braking system which is adapted for use in conjunction with the lift truck described by United States Patent No. 3,122,381 granted to Richard E. Klemick and John E. Budro on February 25, 1964.

One object of the invention is to provide an improved braking system of the type set forth.

A further object of this invention is to produce a braking system of the type set forth in which the fluid used to raise loaded lift of the truck is utilized to actuate the braking system.

A still further object is to produce a braking system wherein the greater the load carried by the truck lift, the greater the pressure in the braking system so that the effectiveness of the braking system will be directly proportional to the load on the truck, thus providing the operator with uniform braking control, regardless of load conditions.

A still further objective of the invention is to provide a braking system control lever located adjacent to the truck operating handle so as to permit stopping, or slowing, of the truck conveniently and with minimum effort.

A still further object is to provide a braking system which, while using the fluid of the hydraulic truck lift raising mechanism, is nevertheless, operable independently of said mechanism.

These, and other objects, are attained by our invention as set forth in the following specification and illustrated in the accompanying drawings, in which.

Since the lift truck to which this invention is applicable may be the same as that shown in the patent aforesaid only so much of the truck structure is shown and described as is necessary to facilitate understanding of the present invention.

Broadly stated, the present invention provides a brake shoe and a hydraulic mechanism for operation of the brake shoe, the brake shoe operating mechanism deriving its fluid from the hydraulic system of the lift truck proper and deriving its power from the load carried by the truck lift.

Figure 1:
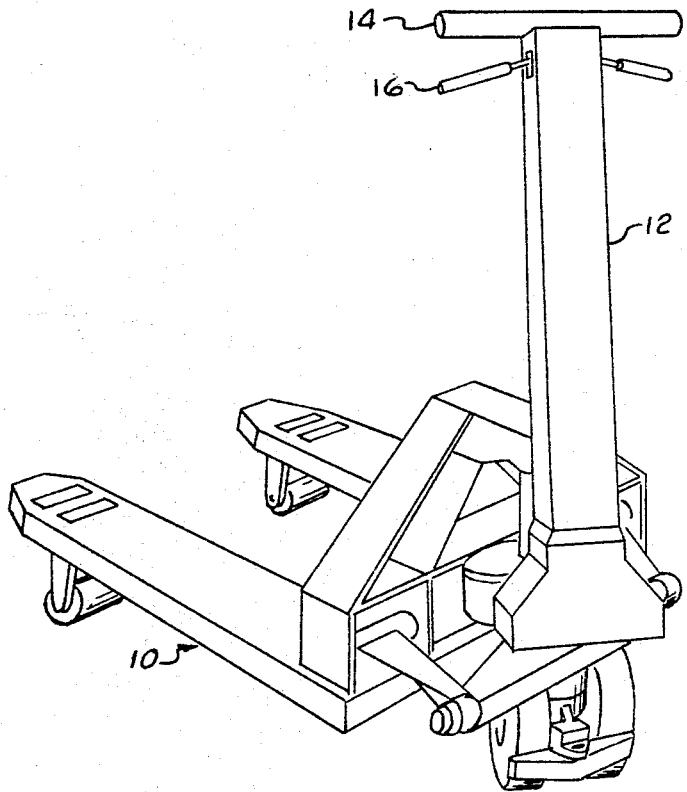
FIG. 1 is a perspective view of a lift truck embodying the invention.

The braking system of the present invention includes a valve control lever 16 which is pivoted at 18, to the main operating handle 12 of the truck 10, just below grip portion 14. See FIGS. 1 and 2.

Figure 2:
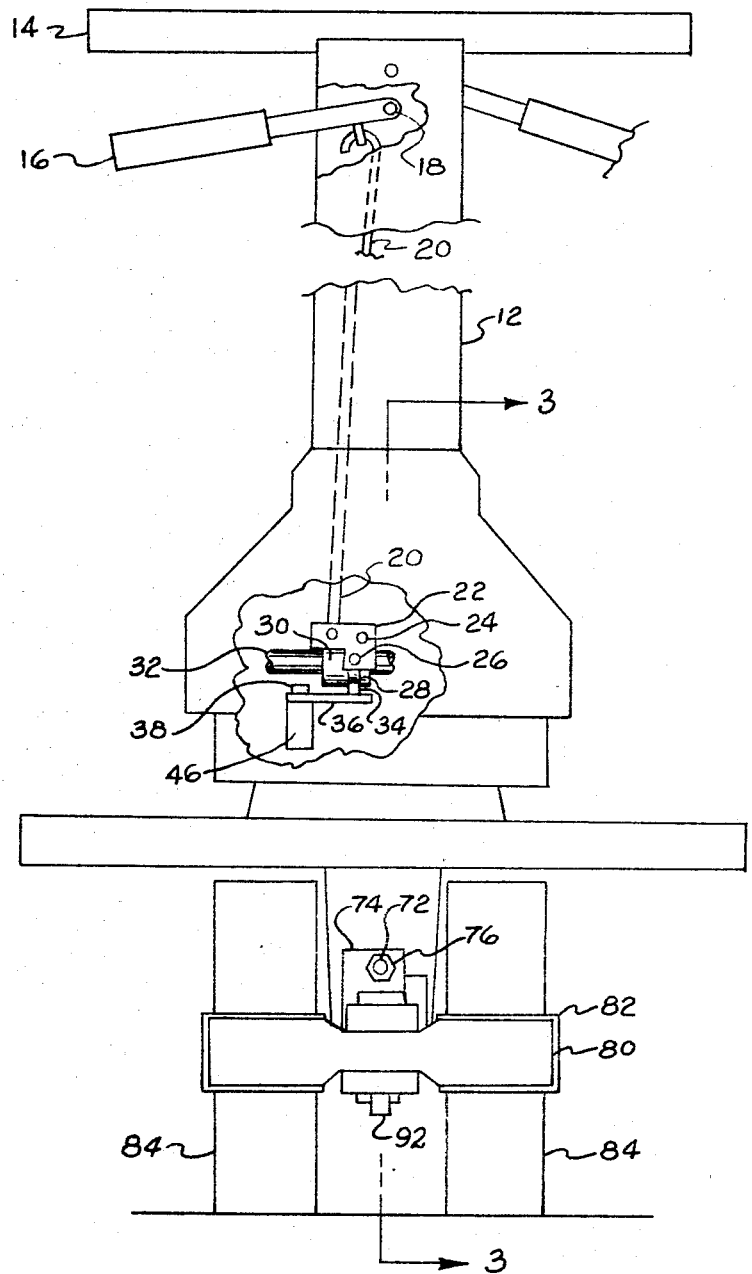
FIG. 2 is a front elevational view with a part of the housing broken away to show details of construction.
Figure 3:
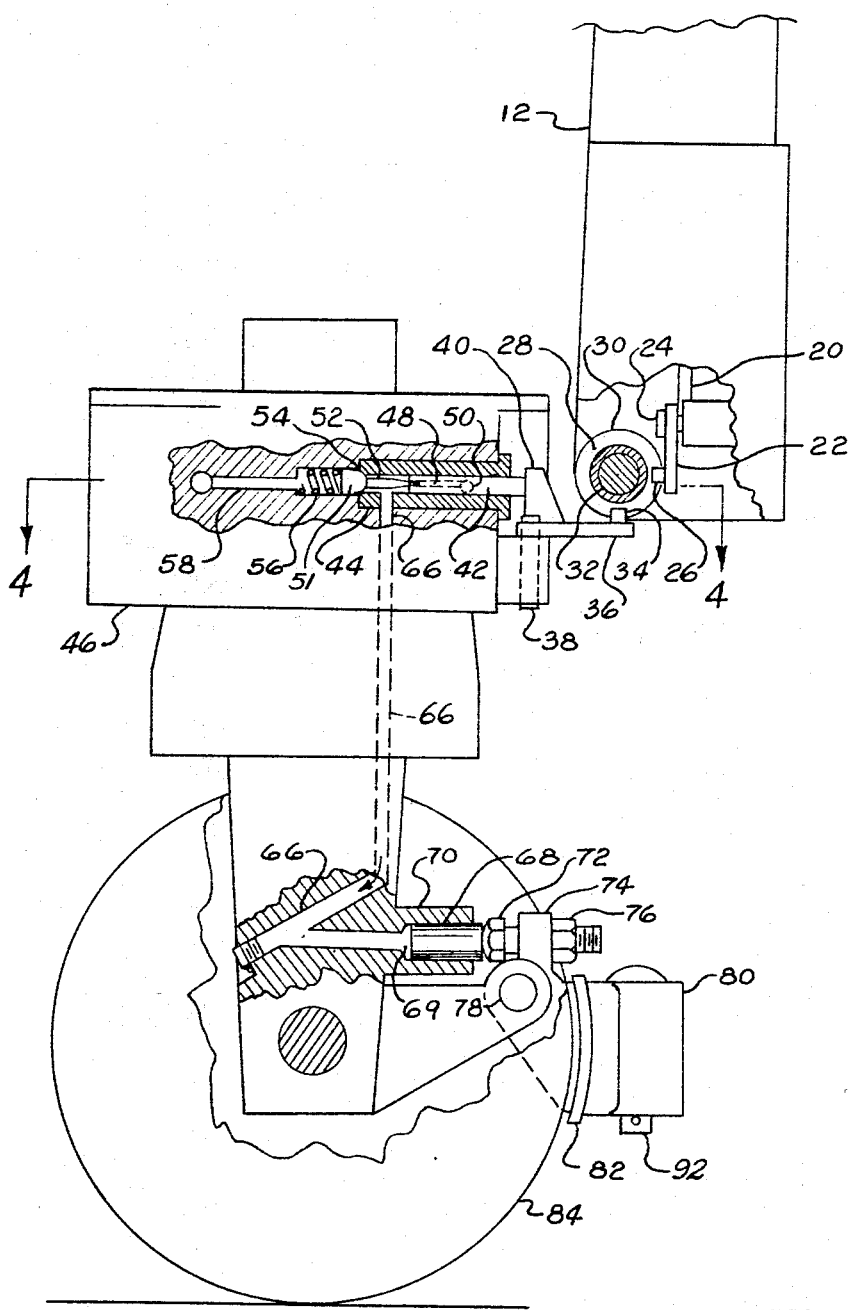
FIG. 3 is a side view, partly in elevation and partly in section, looking in the direction of line 3—3 on FIG. 2.
Figure 4:
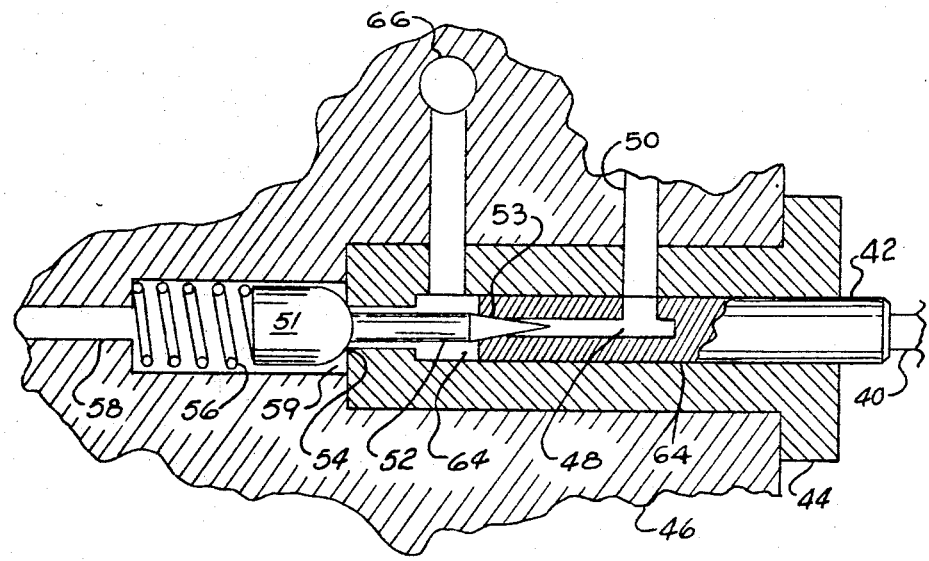
FIG. 4 is an enlarged sectional view looking in the direction of line 4—4 on FIG. 3.
Figure 5:
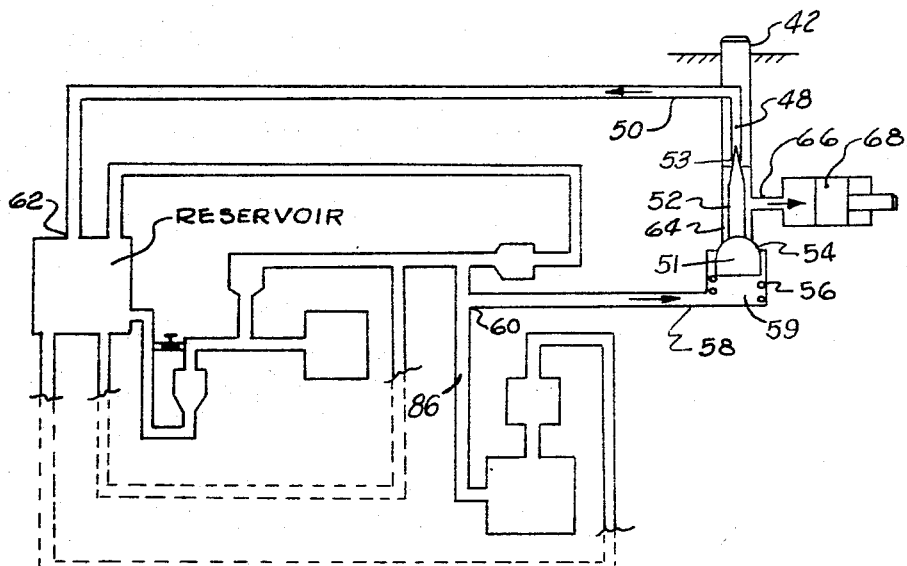
FIG. 5 is a diagrammatic flow chart which is similar to the flow chart shown in FIGS. 12 and 13 of the aforementioned patent.

As control 16 is pulled up, it rotates, in clockwise direction about pivot 18 and causes link 20 to move upwardly and to rotate bell crank lever 22, also in clockwise direction, about pivot 24. FIG. 2. Bell crank lever 22 is provided with a pin 26 which engages in cam slot 28 in sleeve 30. FIG. 3. Movement of lever 22 therefore causes sleeve 30 to travel in a horizontal direction along shaft 32. Bell crank 36, which is pivoted, at 38, to housing 46, is provided with a vertical pin 34 which also engages in cam slot 28 in sleeve 30, and, therefore, motion of sleeve 30 causes bell crank 36 to rotate about pivot 38 and, by means of arm 40, which is secured to the opposite end of bell crank 36, to apply pressure to piston 42 which is slidably mounted in piston chamber 64 which is formed in fitting 44. It will be noted that truck operating handle 12 is pivoted about shaft 32 and therefore permits operation of the brake linkage regardless of the position of handle 12. As may be seen in FIG. 3 and FIG. 4, housing 46 has an auxiliary chamber 59 for housing a valve plug 51 which is adapted to close the adjacent end of chamber 64 as at 54. Valve plug 51 is provided with a valve extension 52 which engages the adjacent end of piston 42 and which is adapted to open and close the end passage 48 which is formed in piston 42 and leads into chamber 64. By this arrangement pressure applied to piston 42 causes it to move into piston chamber 64. This movement of piston 42 carries the valve assembly along with it by means of contact with extension 52 at seat 53. Valve plug 51 is normally biased against seat 54, at the left end of cylinder 44, by means of spring 56 to close chamber 59 from chamber 64. As previously mentioned, actuation of brake handle 16 results in the inward motion of piston 42 which, in turn, moves the valve assembly against the action of spring 56 to provide a passage between chambers 59 and 64. As may be seen in FIG. 4 and FIG. 5, pipe 58, which leads into chamber 59, is directly connected at 60 to the pressure line 86 which corresponds to passage 86 of Klemick Patent No. 3,122,381 which, as shown in FIGS. 4 and 13 of said patent, is connected to pressure chamber 88.

Therefore, the magnitude of the resulting fluid pressure in line 86 of the present disclosure will be in direct proportion to the weight of the load on the truck lift. But, even though the braking force will vary, the operator will detect no difference in the operation of control lever 16, whether the truck lift is heavily or lightly loaded. Upon movement of the valve assembly, valve plug 51 will unseat, and fluid will flow through pipe 58 and chamber 59 into chamber 64 and into pipe 66 which leads to chamber 69 to exert pressure against piston 68 to move it outwardly against pin 72 which is secured to arm 74 at the top of brake shoe 80. FIG. 3. The resulting pressure against arm 74 causes brake shoe 80 to pivot in clockwise direction about pivot pin 78 to bring brake lining 82 into contact with the periphery of wheels 84 and apply braking force proportional to the movement of control lever 16 by the operator. When the operator releases control lever 16, the linkages previously described permit the return travel of piston 42 and valve plug 51 reseats against seat 54 to stop the flow of pressurized fluid from pipe 58. The remaining pressure in chamber 64 now forces piston 42 further outwardly, or to the right, as shown in FIG. 4. This motion breaks the seal between valve extension 52 and piston 42 at seat 53 and thus permits the pressurized fluid to flow into passage 48 and thence through pipe 50 which leads back to the lift truck's hydraulic reservoir at point 62 as seen in flow chart FIG. 5. This pressure release permits the brake actuating piston 68 to retract allowing the brake shoe 80 to return to its normal position and thus disengaging the brake linings 82 from the wheels and permitting unrestricted motion of the truck.

From FIGS. 2 and 3, it will be noted that brake shoe 80 is pivotally mounted at its center and is free to rotate in a horizontal plane about pivot pin 92. This pivoting shoe arrangement permits the brakes to equalize the applied force and permits even wear of linings 82. Pin 72, as seen in FIG. 3, is adjustable by means of its threaded shank and is locked in position by lock nut 76. This adjustment feature has been employed to permit compensation for braking lining wear.

What we claim is:

The combination with a lift truck of the type which includes a load supporting plunger, a hydraulic actuating mechanism for raising and lowering said plunger, supporting wheels, at least one brake shoe associated with said wheels and brake shoe actuating means for said brake shoe,
- of a hydraulic power system for applying to said brake shoe actuating means a force which is a function of the magnitude of the load supported by said plunger, said hydraulic power system comprising:
- a housing,
- a piston chamber formed in said housing,
- a piston having an axial passage therein and which leads to said piston chamber,
- a first conduit leading from said passage to a source of fluid,
- a second conduit leading from said piston chamber to said brake actuating means,
- an auxiliary chamber adjacent to and communicating with said piston chamber,
- a valve assembly including a valve plug in said auxiliary chamber and a valve extension carried by said plug and disposed in said piston chamber and engageable with said piston,
- automatic means for normally moving said valve assembly to a position in which said plug closes the junction of said auxiliary chamber and said piston chamber and said extension engages the adjacent end of the piston and closes the adjacent end of said passage,
- a third conduit leading from said hydraulic power system to said auxiliary chamber to subject the latter to the fluid pressure prevailing in said power system, and
- manually operable means movable in a first direction to move said piston in a direction to unseat said valve plug to establish communication between said hydraulic power system and said brake shoe actuating means, said piston upon release of said manually operable means being movable in a second direction by the fluid pressure in said brake shoe actuating means to disengage said valve extension from said passage to establish communication between said brake shoe actuating means and said source of fluid.

References Cited by the Examiner

UNITED STATES PATENTS

| | | | |
|---|---|---|---|
| 2,940,767 | 6/1960 | Quayle | 280—43.12 |
| 3,061,380 | 10/1962 | Hale | 303—6 |
| 3,072,418 | 1/1963 | Becker | 280—43.12 |
| 3,122,381 | 2/1964 | Klemick et al. | 280—43.23 |
| 3,178,238 | 4/1965 | Dean | 303—22 |

BENJAMIN HERSH, *Primary Examiner.*

C. C. PARSONS, *Assistant Examiner.*